Patented Oct. 10, 1922.

1,431,906

UNITED STATES PATENT OFFICE.

STEWART J. CARROLL, OF ROCHESTER, NEW YORK, ASSIGNOR TO EASTMAN KODAK COMPANY, OF ROCHESTER, NEW YORK, A CORPORATION OF NEW YORK.

COMPOSITION CONTAINING CELLULOSE NITRATE AND CELLULOSE ETHER AND SOLVENT USED THEREIN.

No Drawing. Application filed April 25, 1921. Serial No. 464,255.

*To all whom it may concern:*

Be it known that I, STEWART J. CARROLL, a citizen of the United States of America, residing at Rochester, in the county of Monroe and State of New York, have invented certain new and useful Improvements in Composition Containing Cellulose Nitrate and Cellulose Ether and Solvent Used Therein, of which the following is a full, clear, and exact specification.

This invention relates to a composition of matter containing cellulose nitrate and cellulose ether and to a solvent used therein. One object of my invention is to produce a composition of matter containing an admixture of nitrate and cellulose ether in any desired proportion. Another object is to produce a solvent which will dissolve cellulose nitrate and cellulose ether in any relative proportion. Still another object is to provide a solution of nitrocellulose and cellulose ether which will be sufficiently strong and viscous to produce photographic film base by the customary methods. Other objects will hereinafter appear.

I have discovered that cellulose nitrate and cellulose ether may be combined in any relative proportion by dissolving them in a mixture of methyl alcohol, ethyl acetate and chloroform. In the preferred form of my invention, I mix the volatile coacting solvents in the proportion of methyl alcohol 45%, ethyl acetate 20% and chloroform 35%, but these proportions may be varied to a considerable extent without departing from my invention. This mixture will dissolve nitrocellulose alone or cellulose ether (for instance, water-insoluble ethyl cellulose) alone, or both of them in any proportion.

While the ratio of solvent to the cellulosic compounds can be varied greatly, in accordance with the use to which the solution is to be put, I find that 4 to 6 parts by weight of the mixed solvent to 1 part by weight of the cellulosic compounds yield a satisfactory thick, flowable dope, such as may be used, for instance, in film manufacture. It has always been a problem to combine the ether and nitrate by a common solvent in such a way as to give a sufficiently strong solution for this purpose. When thinned out with more solvent it acts as a varnish. In the finished films, formed by flowing the composition and allowing the solvents to evaporate, the cellulose nitrate and cellulose ether impart their properties in proportion to the amounts present. Thus, when the amount of cellulose ether equals the amount of cellulose nitrate, the rate of burning is very appreciably diminished, while the film retains many of the useful nitrocellulose properties, including cheapness.

Having thus described my invention, what I claim as new and desire to secure by Letters Patent is:

1. A solvent for both cellulose nitrate and cellulose ether, comprising a mixture of methyl alcohol, ethyl acetate and chloroform.

2. A solvent for cellulose nitrate and cellulose ether comprising methyl alcohol 45%, ethyl acetate 20% and chloroform 35%.

3. A composition of matter, comprising nitrocellulose and cellulose ether in a solvent containing methy alcohol, ethyl acetate and chloroform.

4. A composition of matter comprising cellulose nitrate and cellulose ether dissolved in a mixture containing methyl alcohol 45%, ethyl acetate 20% and chloroform 35%.

5. A composition of matter comprising cellulose nitrate, cellulose ether, and a common mixed solvent, the combined weight of said cellulosic compounds being greater than one-sixth of the weight of the solvent.

Signed at Rochester, New York, this 19th day of April, 1921.

STEWART J. CARROLL.